(12) United States Patent
Anderson et al.

(10) Patent No.: US 11,660,988 B2
(45) Date of Patent: *May 30, 2023

(54) SUPPORT BASE FOR A CHILD SAFETY SEAT

(71) Applicant: Wonderland Switzerland AG, Steinhausen (CH)

(72) Inventors: Robert Scott Anderson, Narvon, PA (US); Curtis M. Hartenstine, Birdsboro, PA (US); Patrick J. G. Bowers, Hockessin, DE (US)

(73) Assignee: Wonderland Switzerland AG, Steinhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/408,405

(22) Filed: Aug. 21, 2021

(65) Prior Publication Data

US 2021/0380025 A1    Dec. 9, 2021

Related U.S. Application Data

(60) Continuation of application No. 16/846,315, filed on Apr. 11, 2020, now Pat. No. 11,130,427, which is a division of application No. 15/995,710, filed on Jun. 1, 2018, now Pat. No. 10,723,245.

(60) Provisional application No. 62/547,397, filed on Aug. 18, 2017, provisional application No. 62/513,759, filed on Jun. 1, 2017.

(51) Int. Cl.
*B60N 2/28* (2006.01)

(52) U.S. Cl.
CPC ............ *B60N 2/2806* (2013.01); *B60N 2/289* (2013.01); *B60N 2/2821* (2013.01); *B60N 2/2824* (2013.01); *B60N 2/2887* (2013.01); *B60N 2/2803* (2013.01); *B60N 2/2809* (2013.01); *B60N 2/2812* (2013.01); *B60N 2002/2815* (2013.01); *B60N 2002/2818* (2013.01)

(58) Field of Classification Search
CPC .. B60N 2/2821; B60N 2/2824; B60N 2/2887; B60N 2/289; B60N 2/2806; B60N 2/2809; B60N 2/2812; B60N 2002/2815; B60N 2002/2818
See application file for complete search history.

(56) References Cited

U.S. PATENT DOCUMENTS 8,973,991 B2 * 3/2015 Wuerstl ............... B60N 2/2821
                                                                    297/253
10,723,245 B2 * 7/2020 Anderson ............ B60N 2/2806

* cited by examiner

*Primary Examiner* — Syed A Islam
(74) *Attorney, Agent, or Firm* — Nz Carr Law Office PLLC

(57) ABSTRACT

A support base for a child safety seat includes a shell, a belt clamp and a latching mechanism. The shell is adapted to receive a child seat thereon, and has a panel at an end thereof and a belt anchoring region adjacent to the panel, the belt anchoring region including a first and a second surface, the second surface being supported by the panel and connected with the first surface. The belt clamp is pivotally connected with the shell, and is operable to clamp a first and a second belt portion respectively adjacent to the first and second surface. The latching mechanism is operable to lock the belt clamp in a clamping state.

23 Claims, 9 Drawing Sheets

SUPPORT BASE FOR A CHILD SAFETY SEAT

CROSS-REFERENCE TO RELATED APPLICATION(S)

This application is a continuation application of U.S. patent application Ser. No. 16/846,315 filed on Apr. 11, 2020, which is a divisional application of U.S. patent application Ser. No. 15/995,710 filed on Jun. 1, 2018, which respectively claims priority to U.S. provisional application No. 62/513,759 filed on Jun. 1, 2017 and to U.S. provisional application No. 62/547,397 filed on Aug. 18, 2017, the disclosures of all of which are hereby incorporated by reference as if set forth in their entireties herein.

BACKGROUND

1. Field of the Invention

The present invention relates to support bases for child safety seats.

2. Description of the Related Art

Child safety seats currently available on the market may include a child seat that can be attached to a support base for easy installation on a vehicle seat. Different approaches have been proposed for restrictedly positioning the support base on a vehicle seat. For example, the support base may be fastened on a vehicle seat with the vehicle safety belt or latch devices provided on the support base. When the vehicle safety belt is used as attachment method, the vehicle safety belt is usually wrapped transversally across the support base and anchored with a clamping device provided at a central position on the support base. With this attachment method, the shoulder belt portion of the vehicle safety belt may stretch relatively freely across the support base, which may result in undesirable interference with a child seat installed on the support base.

Therefore, there is a need for an improved design that can be manufactured in a cost-effective manner, and address at least the foregoing issues.

SUMMARY

The present application describes a support base for a child safety seat. The support base includes a shell, a belt clamp and a latching mechanism. The shell is adapted to receive a child seat thereon, and has a panel at an end thereof and a belt anchoring region adjacent to the panel, the belt anchoring region including a first and a second surface, the second surface being supported by the panel and connected with the first surface. The belt clamp is pivotally connected with the shell, and is operable to clamp a first and a second belt portion respectively adjacent to the first and second surface. The latching mechanism is operable to lock the belt clamp in a clamping state.

According to another aspect, the support base described herein includes a shell, a belt clamp and a latching mechanism. The shell is adapted to receive a child seat thereon, and has a panel at an end thereof and a belt anchoring region adjacent to the panel, the belt anchoring region including a first and a second surface, the second surface being supported by the panel and connected with the first surface. The belt clamp is pivotally connected with the shell and has a belt retaining structure, the belt clamp being operable to clamp a lap belt portion of a vehicle safety belt adjacent to the first surface, and the belt retaining structure being adapted to hold a shoulder belt portion of a vehicle safety belt adjacent to the second surface when the lap belt portion is clamped adjacent to the first surface. The latching mechanism is operable to lock the belt clamp in a clamping state.

DETAILED DESCRIPTION OF THE EMBODIMENTS

Figure 1:
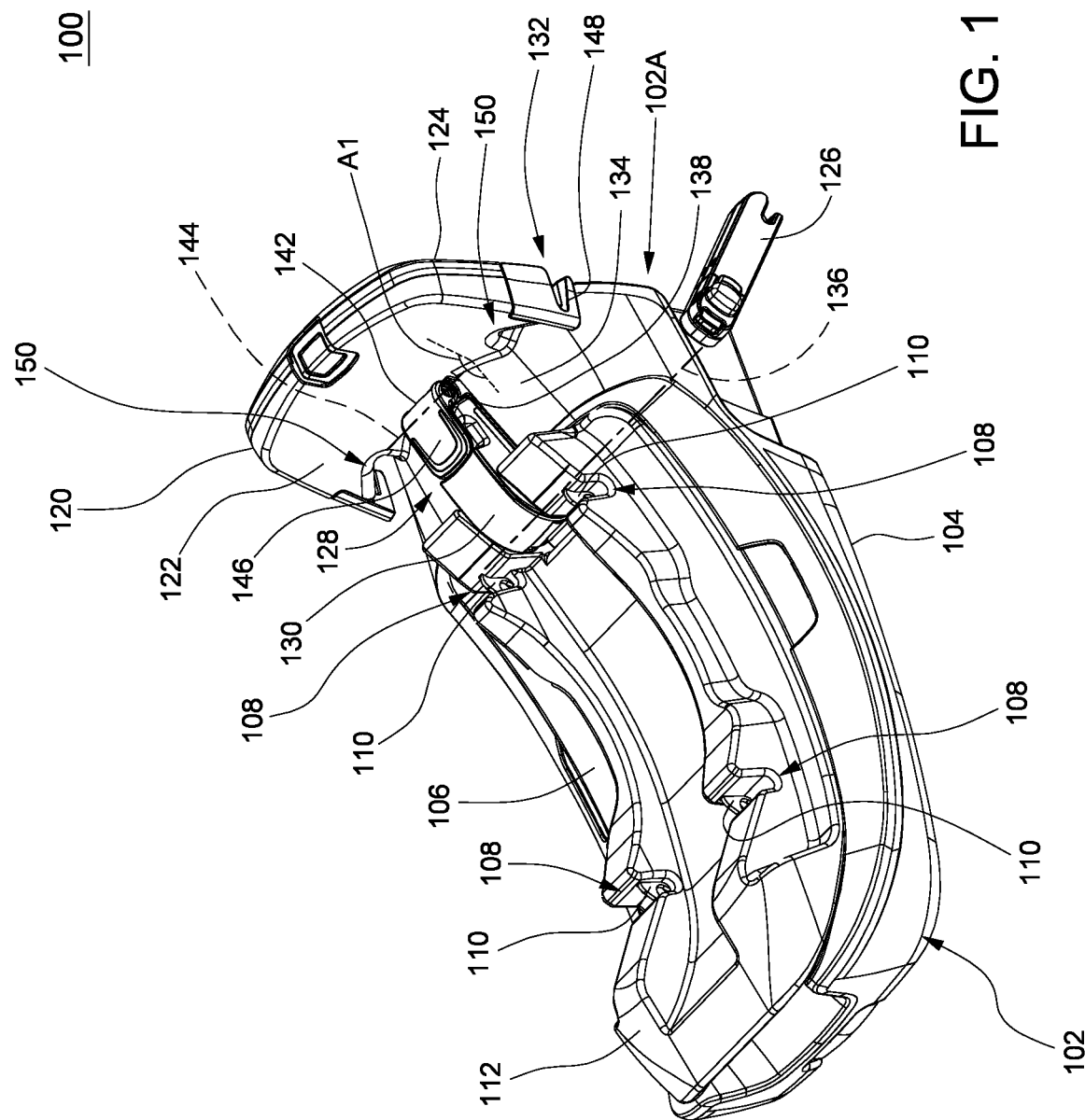
FIG. 1 is a perspective view illustrating an embodiment of a support base for a child safety seat.

FIG. 1 is a perspective view illustrating an embodiment of a support base 100 for a child safety seat. Referring to FIG. 1, the support base 100 can include a shell 102. The shell 102 can include one or more rigid casing portions attached to each other. Exemplary materials suitable for making the shell 102 may include rigid plastic materials. The shell 102 can have a bottom surface 104 suitable for placement on a vehicle seat, and an upper surface 106 suitable for receiving the installation of a child seat (not shown). For example, the upper surface 106 can include a plurality of cavities 108 respectively provided with a plurality of hooks 110 that can engage with corresponding portions of a child seat to lock the child seat in position. In some embodiments, the upper surface 106 may be carried by a sliding platform 112 movable back and forth relative to a lower portion of the shell 102 for adjustment of a child seat installed on the support base 100, and the hooks 110 may be assembled with the sliding platform 112. In the illustrated embodiment, the shell 102 may exemplary include four hooks 110 distributed symmetrically along two rows.

Figure 2:
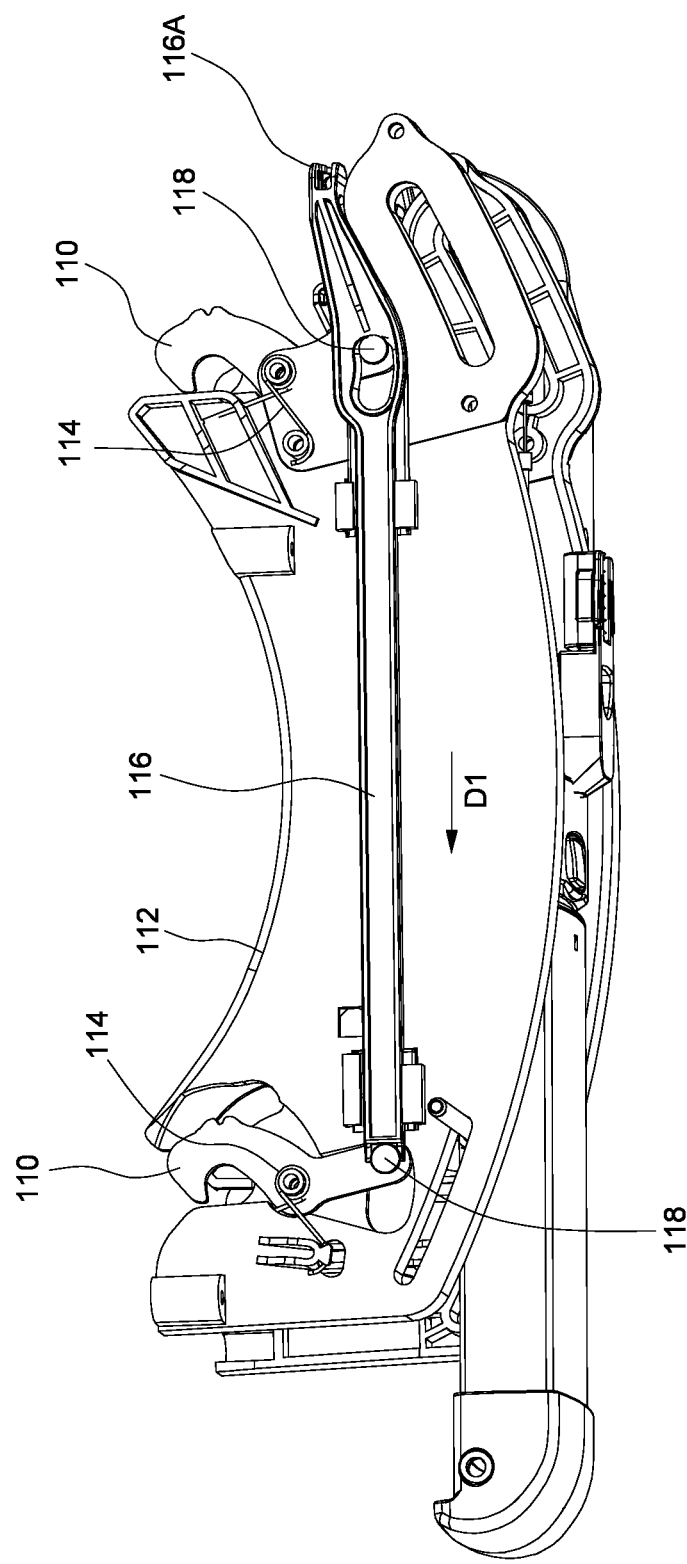
FIG. 2 is a schematic view illustrating the assembly of two hooks in the support base.

In conjunction with FIG. 1, FIG. 2 is a schematic view illustrating the assembly of two hooks 110 along a same row. Referring to FIGS. 1 and 2, the two hooks 110 along a same row can be respectively connected pivotally with the sliding platform 112 about two pivot axes extending transversally from a left to a right side of the support base 100. The hooks 110 can thereby rotate relative to the sliding platform 112 between a locking state and an unlocking state. Each hook 110 can be respectively biased toward the locking state by a separate spring 114. The spring 114 can be disposed around the pivot axis of the hook 110, and can have two opposite ends respectively connected with the hook 110 and the sliding platform 112. Moreover, the two hooks 110 along the same row can further be connected with a linking bar 116 that is assembled with the sliding platform 112 for back and forth sliding movements. For example, each of the two hooks 110 can respectively have a stud 118 that is movably connected with the linking bar 116. The linking bar 116 can thereby slide in a direction D1 to urge the two hooks 110 in rotation to the unlocking state against the biasing force applied by the springs 114.

The two other hooks 110 may be respectively connected with two springs 114 and another linking bar 116 like described previously. For facilitating concurrent unlocking of the four hooks 110, the two linking bars 116 can be respectively coupled with a release button (not shown), e.g., an end 116A of each linking bar 116 can be connected with the release button via a cable (not shown). Actuation of the release button can thereby urge the two linking bars 116 to slide in parallel in the direction D1 to cause concurrent unlocking rotation of the four hooks 110.

Referring again to FIG. 1, an end 102A of the shell 102 can have a panel 120 rising upright. The panel 120 can have a surface 122 on an inner side facing a region of the support base 100 where a child seat can be installed, and another surface 124 on an outer side opposite to the surface 122. According to an embodiment, the panel 120 can be fixedly connected with the shell 102. The support base 100 can be installed on a vehicle seat with the end 102A of the shell 102 and the panel 120 adjacent to the seatback of the vehicle seat. When car collision occurs, the panel 120 (in particular the surface 124 of the panel 120) can offer an enlarged contact area against the seatback of the vehicle seat to prevent undesirable rebound of the child safety seat.

Referring again to FIG. 1, the support base 100 may include two latch devices 126 operable to releasably engage with an anchor structure (e.g., ISOFIX anchor) provided in a vehicle to lock the support base 100 in place on a vehicle seat. The two latch devices 126 may be assembled with the shell 102 adjacent to the end 102A thereof and below the panel 120, and can be respectively disposed adjacent to a left and a right side of the shell 102.

Moreover, the support base 100 can include an anchoring system 128 that can be used for attaching the support base 100 on a vehicle seat with a vehicle safety belt. The anchoring system 128 may be implemented independently from the latch devices 126, or in combination with the latch devices 126. Referring to FIG. 1, the anchoring system 128 can include a belt clamp 130 and a belt retaining structure 132. The belt clamp 130 is operable to clamp a lap belt portion of a vehicle safety belt adjacent to a surface 134 of the shell 102, and the belt retaining structure 132 is configured to hold a shoulder belt portion of a vehicle safety belt adjacent to the panel 120. The surface 134 of the shell 102 across which a lap belt portion can be wrapped is located contiguously below the surface 122 of the panel 120, and both surfaces 122 and 134 can have different slopes so that the surface 122 projects at an angle from the surface 134. For example, the surface 134 can be inclined an angle, and the surface 122 can rise steeply upright from the surface 134. According to an embodiment, an angle A1 defined between the two surfaces 122 and 134 may be equal to or greater than 90 degrees.

The belt clamp 130 can be disposed on the inner side of the panel 120, e.g., adjacent to the surface 122 of the panel 120. According to an example of construction, the belt clamp 130 can be formed as a unitary part. The belt clamp 130 can be pivotally connected with the shell 102 about a pivot axis 136 extending transversally from a left to a right side of the support base 100, and can have a distal edge 138 distant from the pivot axis 136. The belt clamp 130 is thereby rotatable relative to the shell 102 between a clamping state and a release state. The distal edge 138 of the belt clamp 130 can be positioned adjacent to the surface 134 of the shell 102 in the clamping state, and can be displaced upward and away from the surface 134 of the shell 102 in the release state. According to an embodiment, the panel 120 fixedly connected with the shell 102 can rise above the belt clamp 130.

Referring to FIG. 1, the support base 100 can further include a latching mechanism operable to lock the belt clamp 130 in the clamping state. The latching mechanism can include a latch 142 pivotally connected with the shell 102 about a pivot axis 144 extending transversally from a left to a right side of the support base 100. According to an example of construction, the latch 142 can be integrally formed as a single part. The pivot axis 144 of the latch 142 can be substantially parallel to the pivot axis 136 of the belt clamp 130. The latch 142 is thereby rotatable relative to the shell 102 to engage and lock the belt clamp 130 in the clamping state, and disengage and unlock the belt clamp 130 for its rotation between the clamping state and the release state. While the latch 142 is engaged with the belt clamp 130 in the clamping state, the latch 142 can extend over the distal edge 138 of the belt clamp 130. In particular, an actuating portion 146 of the latch 142 can cover at least partially the belt clamp 130. The actuating portion 146 can facilitate manual operation of the latch 142 for locking and unlocking the belt clamp 130.

According to an embodiment, the belt clamp 130 may be spring biased toward the release state when the latch 142 disengages and unlocks the belt clamp 130, which may facilitate installation of a vehicle safety belt. For example, a spring (not shown) may be disposed around the pivot axis 136 of the belt clamp 130 and connect to the belt clamp 130 for providing the biasing force that assists in releasing the belt clamp 130.

Referring again to FIG. 1, the belt retaining structure 132 can be provided on the panel 120. According to an embodiment, the belt retaining structure 132 can include two belt guides 148 respectively disposed at a left and a right side of the panel 120. According to an example of construction, each belt guide 148 can be shaped as a slot. The belt guides 148 can be opened on the outer side of the panel 120 for insertion of a shoulder belt portion therein. Moreover, the shell 102 can include two channels 150 extending through the panel 120 from the inner side to the outer side thereof. The two channels 150 can be provided at a left and a right side of the belt clamp 130. Each channel 150 is adapted to receive the passage of a shoulder belt portion so that it can be held adjacent to the panel 120 with the belt retaining structure 132.

Figure 3:
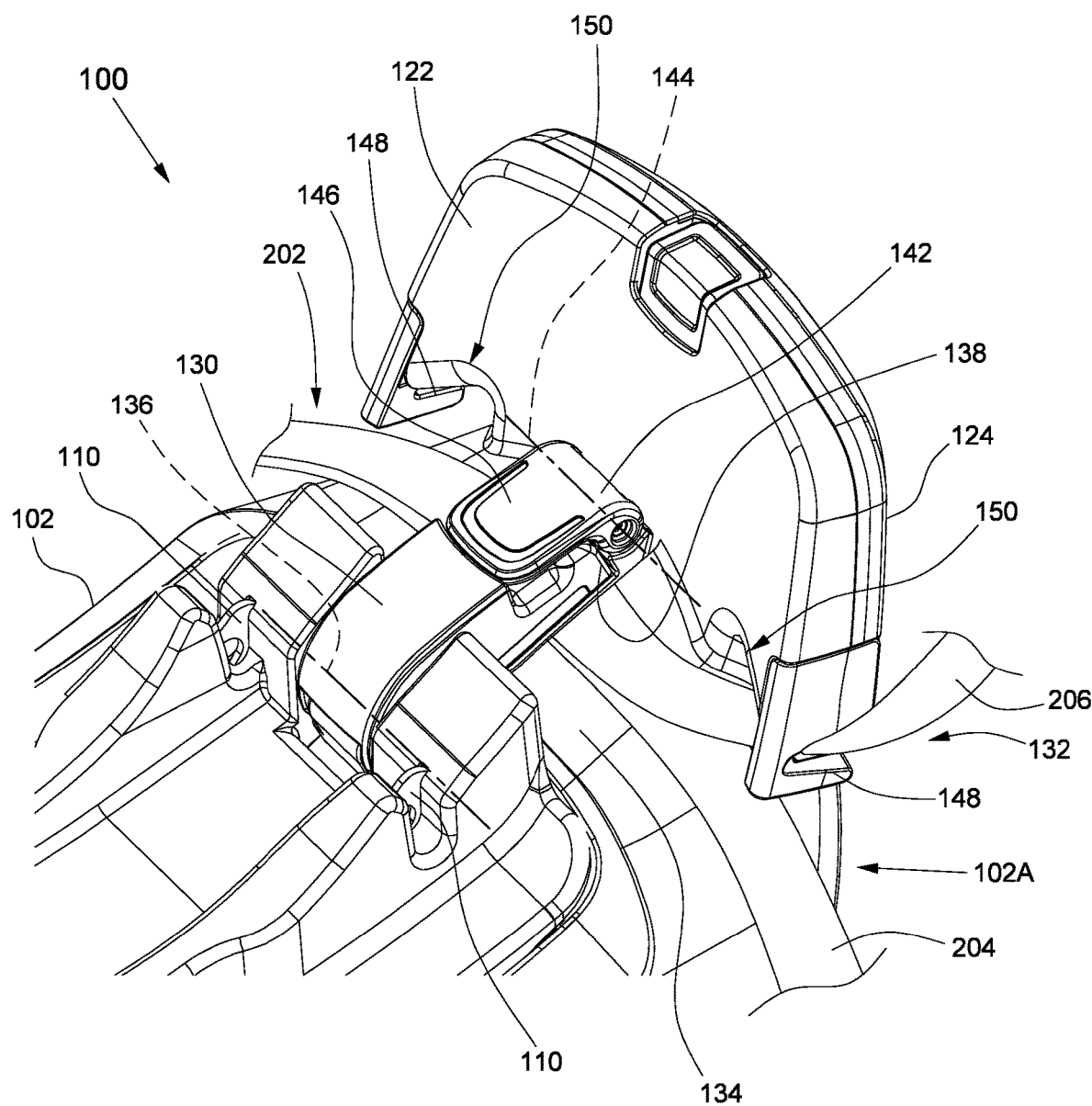
FIG. 3 is a schematic view illustrating exemplary installation of a vehicle safety belt that is attached with an anchoring system provided in the support base shown in FIG. 1.

FIG. 3 is a schematic view illustrating exemplary installation of a vehicle safety belt 202 that is attached to the support base 100 with the anchoring system 128. The vehicle safety belt 202 can include a lap belt portion 204 and a shoulder belt portion 206. The lap belt portion 204 and the shoulder belt portion 206 can stretch transversally across the surface 134 of the shell 102, and can be centrally clamped with the belt clamp 130. The lap belt portion 204 can thereby wrap in contact with the surface 134 of the shell 102. Moreover, the shoulder belt portion 206 can extend through one channel 150 and retained through one belt guide 148 of the belt retaining structure 132. The shoulder belt portion 206 can be thereby held in contact with the panel 120, which can prevent interference between the shoulder belt portion 206 with a child seat installed on the support base 100. Moreover, the shoulder belt portion 206 can be prevented from undesirably applying a loading force on the support base 100 during car collision.

Figure 4:
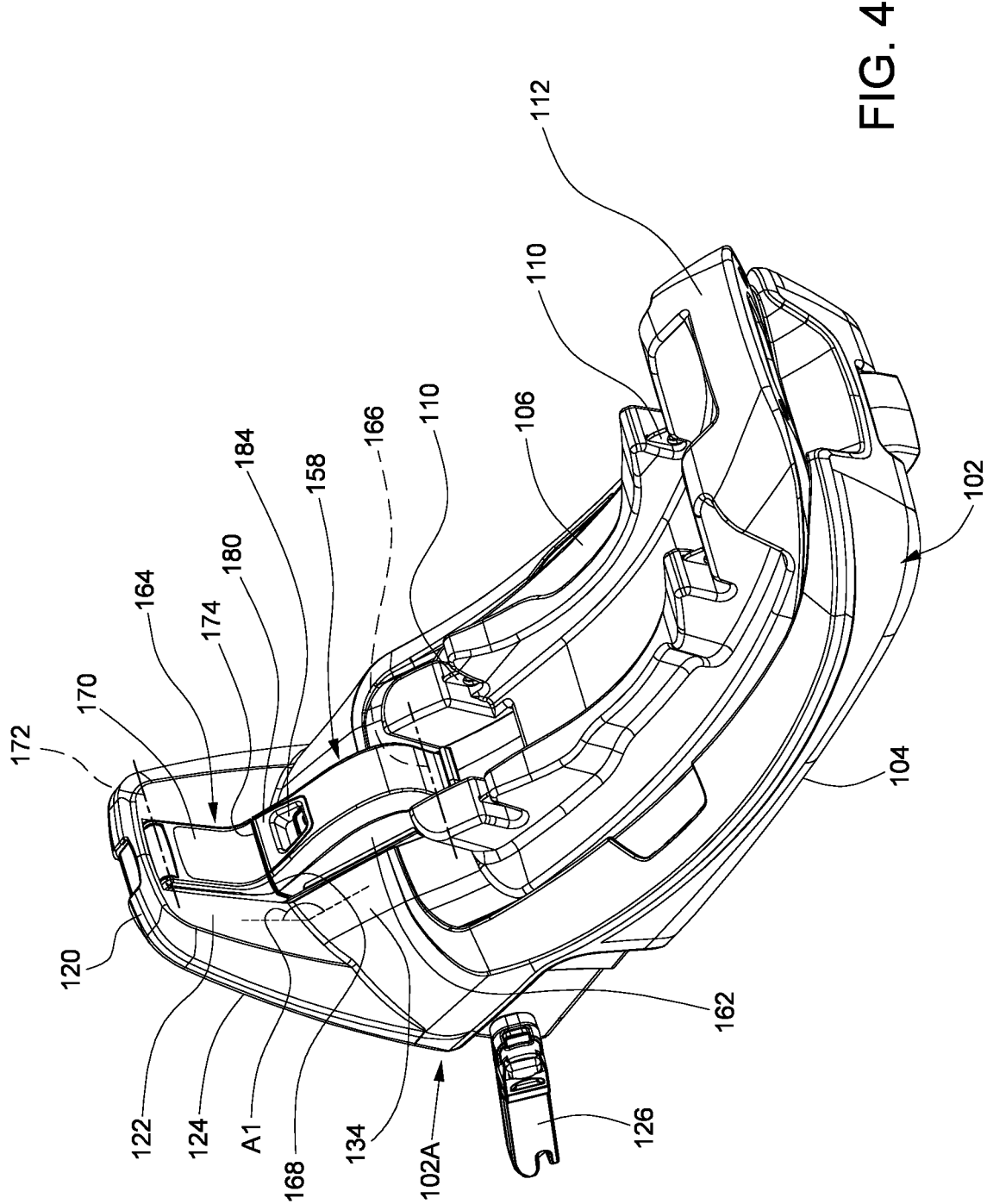
FIG. 4 is a perspective view illustrating a variant construction of an anchoring system provided in a support base for its attachment on a vehicle seat with a vehicle safety belt.
Figure 5:
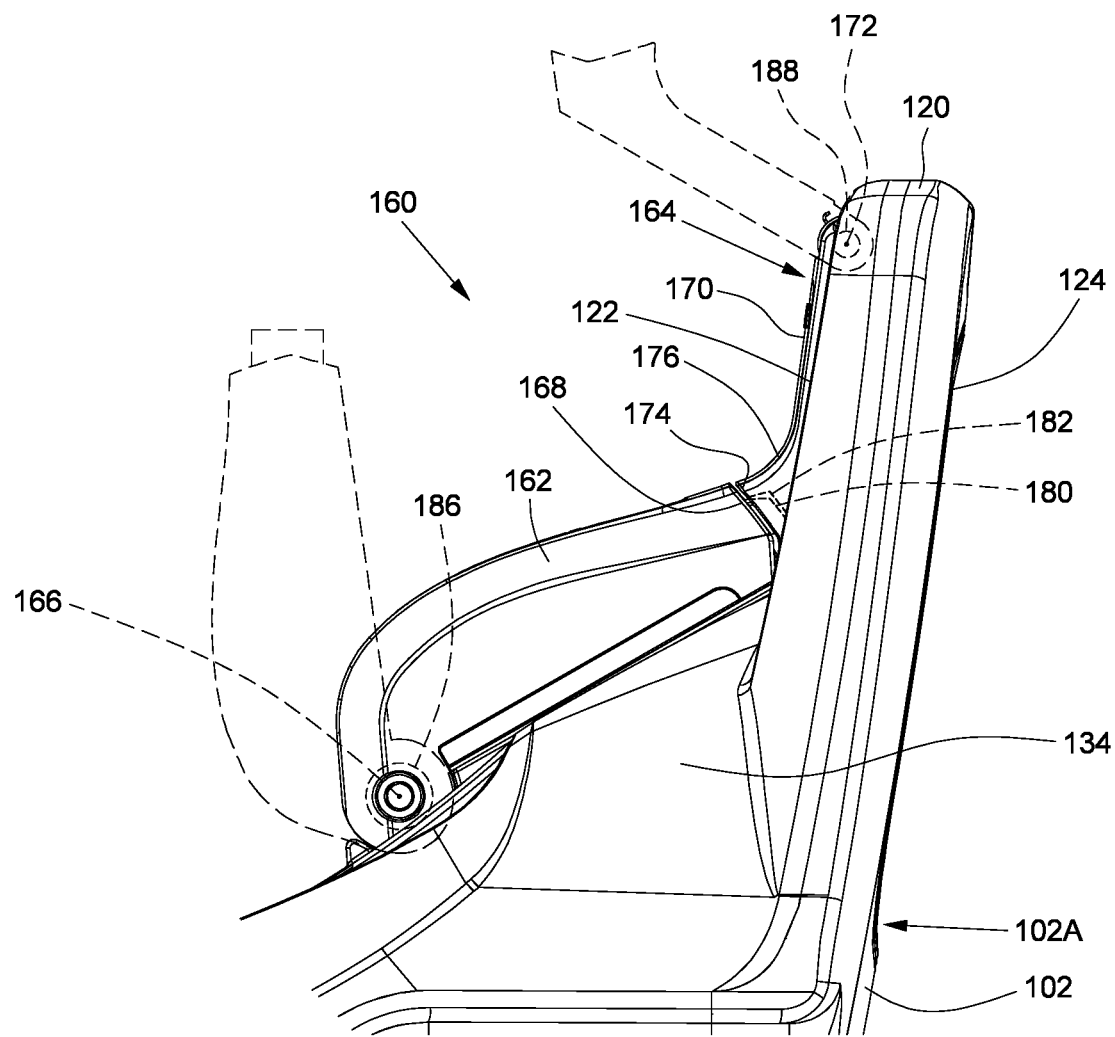
FIG. 5 is an enlarged side view illustrating the anchoring system provided in the support base shown in FIG. 4.

FIG. 4 is a perspective view illustrating a variant construction of an anchoring system 158 provided in the support base 100 for its attachment on a vehicle seat with a vehicle safety belt, and FIG. 5 is an enlarged side view illustrating the anchoring system 158. In the embodiment illustrated in FIGS. 4 and 5, the panel 120 of the support base 100 can likewise protrude upright at the end 102A of the shell 102, and the surface 122 of the panel 120 can rise steeply from the surface 134 of the shell 102 where a lap belt portion of a vehicle safety belt can be wrapped for attaching the support base 100. According to an embodiment, the angle A1 defined between the two surfaces 122 and 134 may be equal to or greater than 90 degrees. The two contiguous surfaces 122 and 134 can define at least partially a belt anchoring region 160 adjacent to the panel 120.

Referring to FIGS. 4 and 5, the anchoring system 158 can be disposed in the belt anchoring region 160, and can substitute for the anchoring system 128 described previously. The anchoring system 158 can include a belt clamp 162 and a belt retaining structure 164. Like previously described, the belt clamp 162 is operable to clamp a lap belt portion of a vehicle safety belt adjacent to the surface 134 of the shell 102, and the belt retaining structure 164 is configured to hold a shoulder belt portion of a vehicle safety belt adjacent to the panel 120.

The belt clamp 162 can be disposed on the inner side of the panel 120, e.g., adjacent to the surface 122 of the panel 120 which can rise above the belt clamp 162. According to an example of construction, the belt clamp 162 can be provided as a unitary part. The belt clamp 162 can be pivotally connected with the shell 102 about a pivot axis 166 extending transversally from a left to a right side of the support base 100, and can have a distal edge 168 distant from the pivot axis 166. The belt clamp 162 is thereby rotatable relative to the shell 102 between a clamping state where the distal edge 168 is positioned adjacent to the surface 134 of the shell 102, and a release state where the distal edge 168 is displaced upward and away from the surface 134 of the shell 102.

The belt retaining structure 164 can be provided on the panel 120. More specifically, the belt retaining structure 164 can include a belt clamp 170 that is pivotally connected with the panel 120 about a pivot axis 172 and has a distal edge 174 distant from the pivot axis 172. According to an example of construction, the belt clamp 170 can be provided as a unitary part. The pivot axis 172 of the belt clamp 170 can extend transversally from the left to right side of the support base 100, and can be substantially parallel to the pivot axis 166 of the belt clamp 162. The belt clamp 170 is thereby rotatable relative to the panel 120 between a clamping state where the distal edge 174 is positioned adjacent to the surface 122 of the panel 120, and a release state where the distal edge 174 is displaced away from the surface 122 of the panel 120.

According to an embodiment, the two belt clamps 162 and 170 are disposed along a central axis of the support base 100. The belt clamps 162 and 170 can be placed so that the distal edge 168 of the belt clamp 162 and the distal edge 174 of the belt clamp 170 can be adjacent to each other when the two belt clamps 162 and 170 are in the clamping state, as shown in FIG. 4. The two belt clamps 162 and 170 in the clamping state can extend along two directions that form an angle at least equal to or higher than 90 degrees. According to an example of construction, the belt clamp 170 may further have has a bend portion 176 that ends at the distal edge 174, so that a smooth transition profile from the belt clamp 162 to the belt clamp 170 may be provided in the clamping state. When the two belt clamps 162 and 170 are in the release state, the distal edge 168 of the belt clamp 162 and the distal edge 174 of the belt clamp 170 can be displaced away from each other, as shown with phantom lines in FIG. 5.

Referring to FIGS. 4 and 5, the support base 100 can further include a latching mechanism operable to lock the belt clamps 162 and 170 in the clamping state. According to an example of construction, this latching mechanism can include a latch 180 provided on the belt clamp 162 adjacent to the distal edge 168 thereof. For example, the latch 180 can be assembled with the belt clamp 162 for sliding movements to retract inward and protrude outward from the distal edge 168. The latch 180 is thereby movable to engage and disengage the belt clamp 170, wherein an opening 182 (shown with phantom lines in FIG. 5) may be provided on the distal edge 174 of the belt clamp 170 for receiving the engagement of the latch 180. The latch 180 can thereby engage with the opening 182 of the belt clamp 170 to lock the two belt clamps 162 and 170 in the clamping state, and disengage from the opening 182 of the belt clamp 170 for respective rotation of the belt clamps 162 and 170 relative to the shell 102 between the clamping state and the release state.

Referring to FIG. 4, the latch 180 can have an actuating portion 184 exposed for operation on a surface of the belt clamp 162. The actuating portion 184 may be formed integrally with the latch 180. The actuating portion 184 is operable to urge the latch 180 in movement for disengaging from the belt clamp 170.

According to an embodiment, the two belt clamps 162 and 170 may be spring biased toward the release state for facilitating installation of a vehicle safety belt. For example, as shown in FIG. 5, the two belt clamps 162 and 170 may be respectively connected with two spring 186 and 188 (shown with phantom lines), which may be torsion springs respectively disposed around the pivot axes 166 and 172 of the belt clamps 162 and 170. The springs 186 and 188 may respectively bias the belt clamps 162 and 170 toward the release state when the latch 180 of the latching mechanism unlocks the belt clamps 162 and 170.

Figure 6:
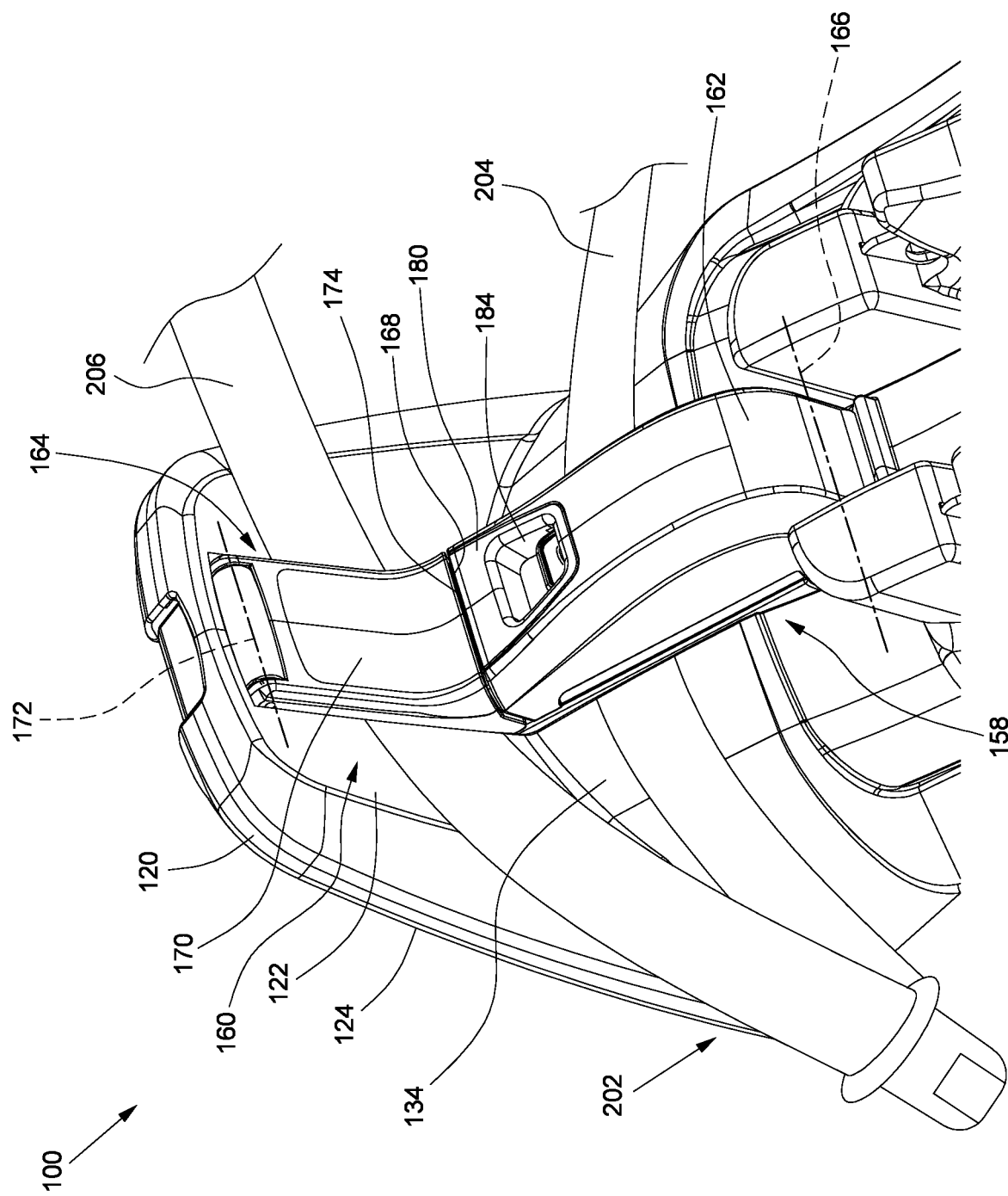
FIG. 6 is a schematic view illustrating exemplary installation of a vehicle safety belt that is attached to the support base with the anchoring system shown in FIGS. 4 and 5.

In conjunction with FIGS. 4 and 5, FIG. 6 is a schematic view illustrating exemplary installation of a vehicle safety belt 202 that is attached to the support base 100 with the anchoring system 158. Referring to FIG. 6, the lap belt portion 204 and the shoulder belt portion 206 can respectively stretch transversally across the surface 134 of the shell 102 and the surface 122 of the panel 120. The belt clamp 162 can clamp the lap belt portion 204 adjacent to the surface 134, and the belt clamp 170 can clamp the shoulder belt portion 206 adjacent to the surface 122 of the panel 120. The shoulder belt portion 206 can be thereby held in contact with the panel 120, which can prevent interference between the shoulder belt portion 206 with a child seat installed on the support base 100.

Figure 7:
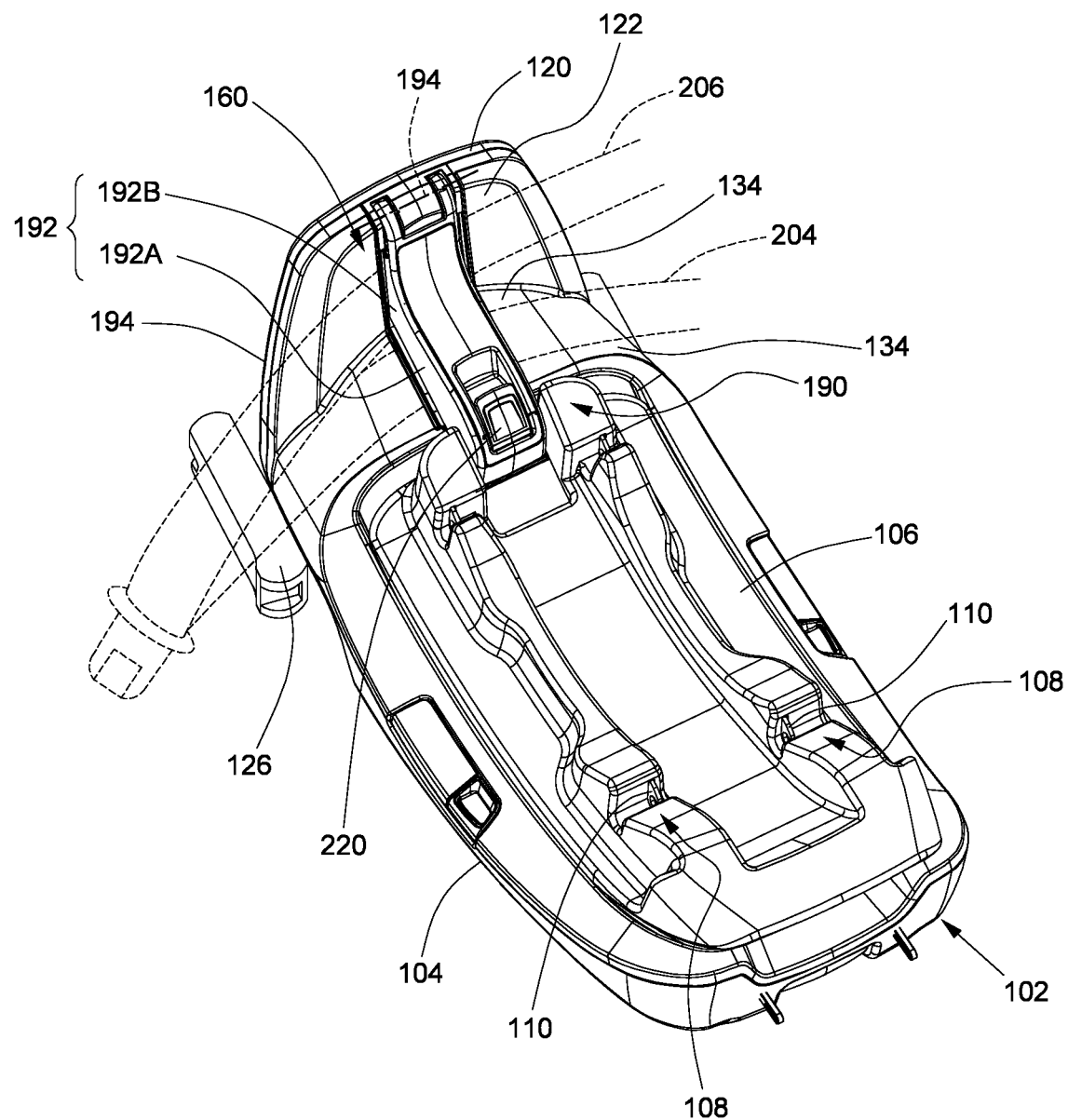
FIG. 7 is a perspective view illustrating a variant construction of an anchoring system provided in the support base for its attachment on a vehicle seat with a vehicle safety belt, the anchoring system being in a clamping state.
Figure 8:
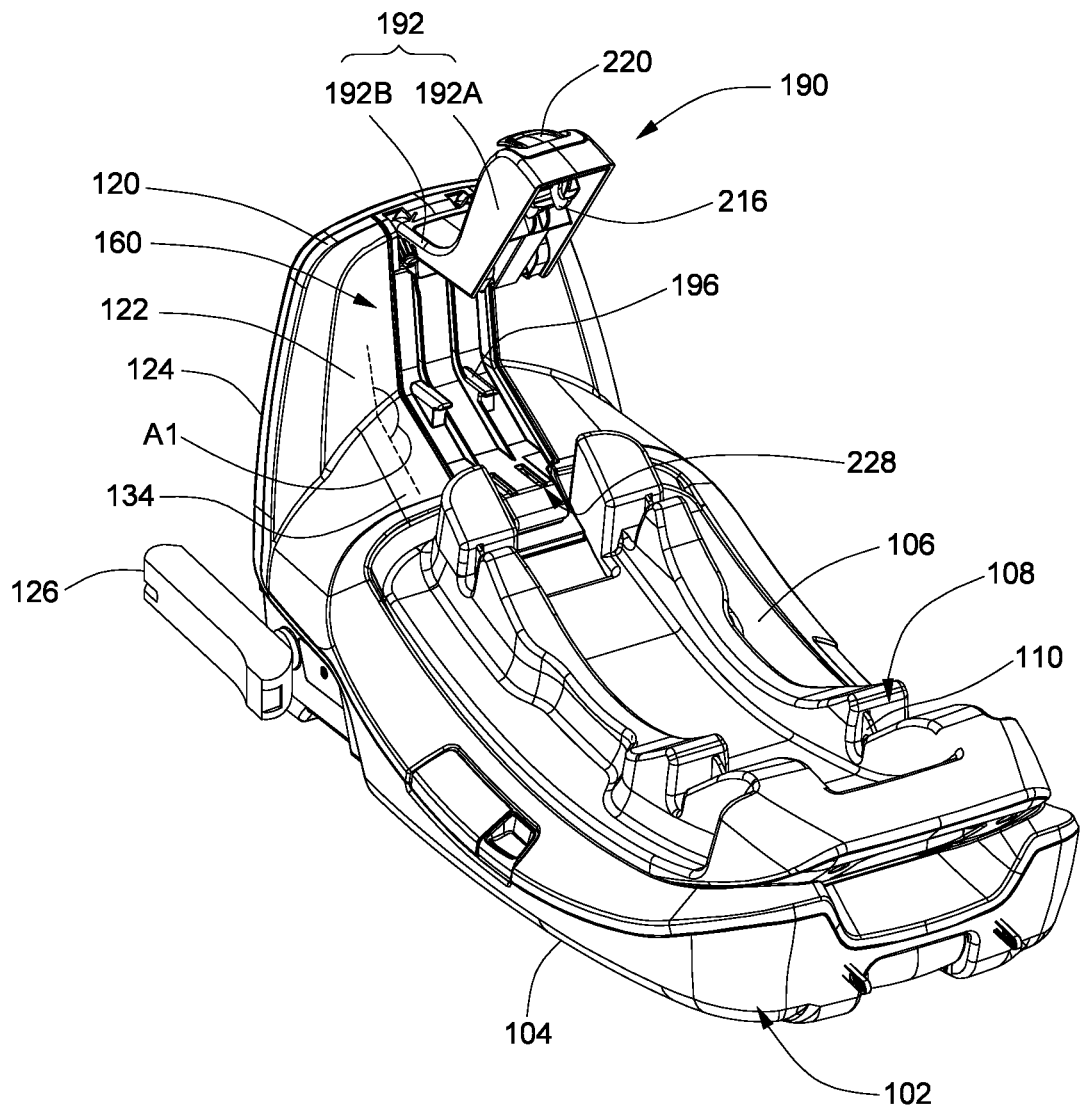
FIG. 8 is a perspective view illustrating the anchoring system shown in FIG. 7 in a release state.

FIGS. 7 and 8 are two perspective views illustrating a variant construction of an anchoring system 190 provided in the support base 100 for its attachment on a vehicle seat with a vehicle safety belt. Referring to FIGS. 7 and 8, the support base 100 can include the panel 120 and the belt anchoring region 160, and the angle A1 between the two surfaces 122 and 134 may be equal to or greater than 90 degrees, like previously described. The anchoring system 190 can be disposed in the belt anchoring region 160, and can include a belt clamp 192 pivotally connected with the shell 102 of the support base 100. The belt clamp 192 can include two clamp portions 192A and 192B that are fixedly connected with each other and form a bend shape, the clamp portion 192B extending at an angle from the clamp portion 192A. According to an example of construction, the belt clamp 192 including the two clamp portions 192A and 192B can be provided as a unitary part. The clamp portion 192B of the belt clamp 192 can be pivotally connected with the panel 120 of the shell 102 about a pivot axis 194 extending transversally from a left to a right side of the support base 100. The belt clamp 192 is thereby rotatable relative to the shell 102 between a clamping state (shown in FIG. 7) where the two clamp portions 192A and 192B are respectively positioned adjacent to the surface 134 of the shell 102 and the surface 122 of the panel 120, and a release state (shown in FIG. 8) where the two clamp portions 192A and 192B are generally displaced away from the surface 134 of the shell 102 and the surface 122 of the panel 120. In the clamping state, the clamp portion 192A can clamp a lap belt portion 204 (shown with phantom lines in FIG. 7) of a vehicle safety belt adjacent to the surface 134 of the shell 102, and the clamp portion 192B can clamp and hold a shoulder belt portion 206 (shown with phantom lines in FIG. 7) of a vehicle safety belt adjacent to the surface 122 of the panel 120. The clamp portion 192B of the belt clamp 192 can accordingly form a belt retaining structure for holding a shoulder belt portion 206 of a vehicle safety belt adjacent to the panel 120. In this manner, the lap belt portion 204 and the shoulder belt portion 206 of the vehicle safety belt can be simultaneously clamped and held at two different paths that are spaced apart from each other, which can prevent interference between the lap belt portion 204 and the shoulder belt portion 206. According to an example of construction, the shell 102 may further include a rib 196 (better shown in FIG. 8) that is disposed between the two regions where the lap belt portion and the shoulder belt portion can be respectively clamped by the two clamp portions 192A and 192B of the belt clamp 192. The rib 196 can facilitate positioning of the lap belt portion and the shoulder belt portion to be clamped by the belt clamp 192.

Figure 9:
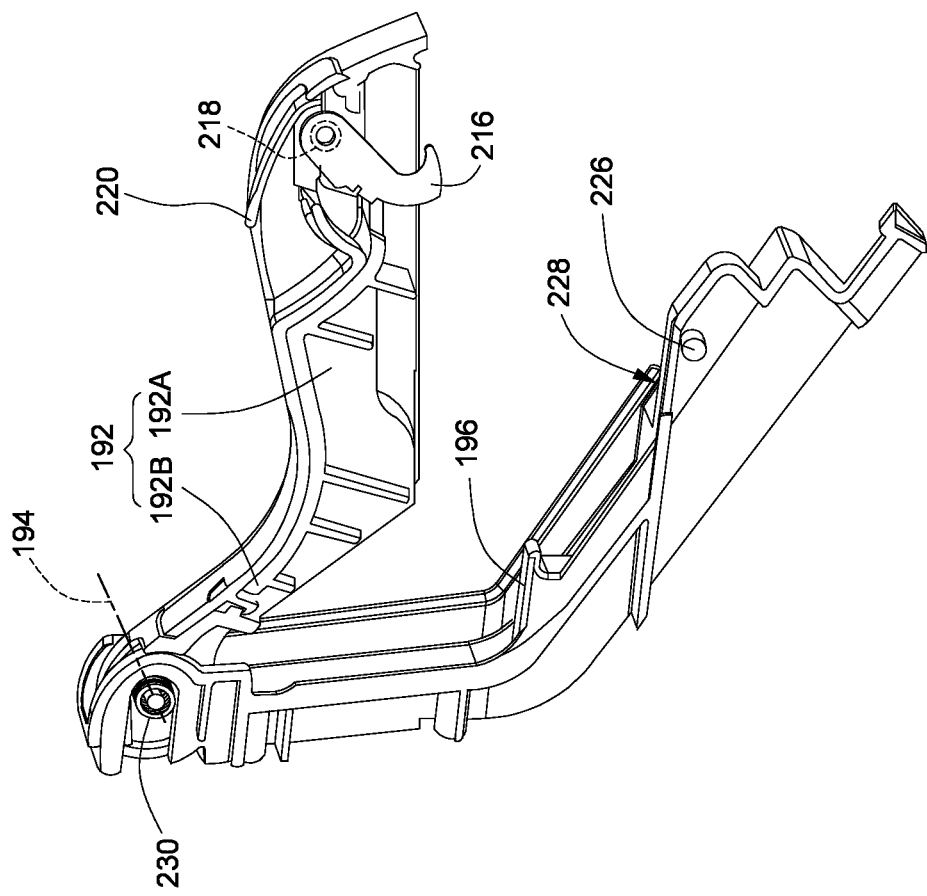
FIG. 9 is a cross-sectional view illustrating a latching mechanism for locking a belt clamp of the anchoring system shown in FIGS. 7 and 8 in a clamping state.

In conjunction with FIGS. 7 and 8, FIG. 9 is a cross-sectional view illustrating an exemplary construction of a latching mechanism operable to lock the belt clamp 192 in the clamping state. For clarity, only a portion of the shell adjacent to the latch mechanism is shown in FIG. 9. Referring to FIGS. 7-9, this latching mechanism can be assembled with the belt clamp 192, and can include a latch 216, a spring 218 (shown with phantom lines in FIG. 9) and a release actuator 220. According to an example of construction, the latch 216 may have a hook shape. The latch 216 can be pivotally connected with the belt clamp 192, and can project at an underside of the clamp portion 192A. The latch 216 is thereby rotatable relative to the belt clamp 192 to engage with the shell 102 for locking the belt clamp 192 in the clamping state, and to disengage from the shell 102 for unlocking the belt clamp 192. For example, the shell 102 may be fixedly connected with an anchor pin 226, and the latch 216 is rotatable through a slit 228 provided on the shell 102 to engage with and disengage from the anchor pin 226.

The spring 218 can be a torsion spring having two ends respectively connected with the belt clamp 192 and the latch 216. The spring 218 can bias the latch 216 toward a locking state for locking engagement with the shell 102.

The release actuator 220 can be disposed adjacent to the latch 216, and can be exposed on the belt clamp 192 for manual operation. According to an embodiment, the release actuator 220 can be pivotally connected with the belt clamp 192. The release actuator 220 is thereby rotatable relative to the belt clamp 192 to urge the latch 216 in rotation for disengaging from the anchor pin 226 provided on the shell 102.

Referring to FIG. 9, the belt clamp 192 may further be connected with a spring 230, which can bias the belt clamp 192 toward the release state when the latch 216 unlocks the belt clamp 192. The spring 230 may be disposed around the pivot axis 194 of the belt clamp 192.

Advantages of the structures described herein include the ability to provide a support base for a child safety seat having an anchoring system that can facilitate the attachment of the support base with a vehicle safety belt. The anchoring systems described herein can clamp a lap belt portion of the vehicle safety belt, and hold a shoulder belt portion of the vehicle safety belt adjacent to an end panel of the support base, which can advantageously prevent undesirable interference with a child seat installed on the support base.

Realization of the support base for a child safety seat has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A support base for a child safety seat, comprising:
    a shell adapted to receive a child seat thereon, an end of the shell having a panel, and the shell further including a belt anchoring region adjacent to the panel, the belt anchoring region including a first and a second surface, the second surface being supported by the panel and connected with the first surface;
    a belt clamp pivotally connected with the shell, the belt clamp being operable to clamp a first and a second belt portion respectively adjacent to the first and second surface; and
    a latching mechanism operable to lock the belt clamp in a clamping state.

2. The support base according to claim 1, wherein the second surface projects at an angle from the first surface.

3. The support base according to claim 2, wherein the angle is equal to or greater than 90 degrees.

4. The support base according to claim 1, wherein the belt clamp includes a first and a second clamp portion, the second clamp portion being connected with the first clamp portion, the first clamp portion being adapted to clamp a first belt portion adjacent to the first surface, and the second clamp portion being adapted to clamp a second belt portion adjacent to the second surface.

5. The support base according to claim 4, wherein the belt clamp including the first and second clamp portions is formed as a unitary part.

6. The support base according to claim 4, wherein the second clamp portion is pivotally connected with the panel of the shell.

7. The support base according to claim 4, wherein the belt clamp is rotatable relative to the shell between the clamping state where the first and second clamp portion are respectively positioned adjacent to the first and second surface, and a release state where the first and second clamp portion are respectively displaced away from the first and second surface.

8. The support base according to claim 4, wherein the latching mechanism includes a latch connected with the belt clamp, the latch being movable to engage and disengage the shell, the latch being engaged with the shell for locking the belt clamp in the clamping state, and the latch being disengaged from the shell for unlocking the belt clamp.

9. The support base according to claim 8, wherein the latch is at an underside of the first clamp portion.

10. The support base according to claim 8, wherein the shell is connected with an anchor pin, and the latch is movable through a slit provided on the shell to engage with and disengage from the anchor pin.

11. The support base according to claim 8, wherein the latching mechanism further includes a spring respectively connected with the belt clamp and the latch, the spring biasing the latch toward a locking state for locking engagement with the shell.

12. The support base according to claim 8, wherein the latching mechanism further includes a release actuator disposed adjacent to the latch on the belt clamp, the release actuator being operable to urge the latch to disengage from the shell for unlocking the belt clamp.

13. The support base according to claim 1, further including a second spring connected with the belt clamp, the second spring being operable to bias the belt clamp toward a release state when the latching mechanism unlocks the belt clamp.

14. The support base according to claim 1, wherein the shell further include a rib that is disposed between two regions where a first and a second belt portion are respectively placed to be clamped by the belt clamp.

15. A support base for a child safety seat, comprising:
a shell adapted to receive a child seat thereon, an end of the shell having a panel, and the shell further including a belt anchoring region adjacent to the panel, the belt anchoring region including a first and a second surface, the second surface being supported by the panel and connected with the first surface;
a belt clamp pivotally connected with the shell and having a belt retaining structure, the belt clamp being operable to clamp a lap belt portion of a vehicle safety belt adjacent to the first surface, and the belt retaining structure being adapted to hold a shoulder belt portion of a vehicle safety belt adjacent to the second surface when the lap belt portion is clamped adjacent to the first surface; and
a latching mechanism operable to lock the belt clamp in a clamping state.

16. The support base according to claim 15, wherein the second surface projects at an angle from the first surface.

17. The support base according to claim 15, wherein the belt clamp including the belt retaining structure is formed as a unitary part.

18. The support base according to claim 15, wherein the belt clamp includes a first and a second clamp portion, the second clamp portion being connected with the first clamp portion and forming the belt retaining structure, the first clamp portion being adapted to clamp a lap belt portion of a vehicle safety belt adjacent to the first surface, and the second clamp portion being adapted to clamp a shoulder belt portion of a vehicle safety belt adjacent to the second surface.

19. The support base according to claim 15, wherein the latching mechanism includes a latch connected with the belt clamp, the latch being movable to engage and disengage the shell, the latch being engaged with the shell for locking the belt clamp in the clamping state, and the latch being disengaged from the shell for unlocking the belt clamp.

20. The support base according to claim 19, wherein the shell is connected with an anchor pin, and the latch is movable through a slit provided on the shell to engage with and disengage from the anchor pin.

21. The support base according to claim 19, wherein the latching mechanism further includes a spring respectively connected with the belt clamp and the latch, and a release actuator disposed adjacent to the latch on the belt clamp, the spring biasing the latch toward a locking state for locking engagement with the shell, and the release actuator being operable to urge the latch to disengage from the shell for unlocking the belt clamp.

22. The support base according to claim 15, further including a second spring connected with the belt clamp, the second spring being operable to bias the belt clamp toward a release state when the latching mechanism unlocks the belt clamp.

23. The support base according to claim 15, wherein the shell further include a rib that is disposed between two regions where a shoulder belt portion and a lap belt portion of a vehicle safety belt are respectively placed to be held by the belt clamp.

* * * * *